(12) United States Patent
Jouanno et al.

(10) Patent No.: US 9,963,374 B2
(45) Date of Patent: May 8, 2018

(54) METHODS OF FORMING LAMINATED GLASS STRUCTURES

(71) Applicant: Corning Incorporated, Corning, NY (US)

(72) Inventors: Jean-Marc Martin Gerard Jouanno, Painted Post, NY (US); Kiat Chyai Kang, Painted Post, NY (US); Sue Camille Lewis, Webster, NY (US); Govindarajan Natarajan, Poughkeepsie, NY (US); Yu Xiao, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 128 days.

(21) Appl. No.: 14/785,457

(22) PCT Filed: Apr. 14, 2014

(86) PCT No.: PCT/US2014/033925
§ 371 (c)(1),
(2) Date: Oct. 19, 2015

(87) PCT Pub. No.: WO2014/172237
PCT Pub. Date: Oct. 23, 2014

(65) Prior Publication Data
US 2016/0083282 A1 Mar. 24, 2016

Related U.S. Application Data

(60) Provisional application No. 61/813,718, filed on Apr. 19, 2013.

(51) Int. Cl.
*B29C 65/00* (2006.01)
*C03B 27/012* (2006.01)
(Continued)

(52) U.S. Cl.
CPC .......... *C03B 27/012* (2013.01); *B32B 17/061* (2013.01); *B32B 17/064* (2013.01);
(Continued)

(58) Field of Classification Search
CPC . B29C 35/0238; B29C 35/0277; B29C 43/30; B29C 43/52; B29C 44/24; B29C 44/3914
(Continued)

(56) References Cited

U.S. PATENT DOCUMENTS 3,338,696 A 8/1967 Dockerty
3,589,307 A 6/1971 Lanham et al.
(Continued)

FOREIGN PATENT DOCUMENTS

CN 102983213 3/2013
DE 102012101093 B3 4/2013
(Continued)

OTHER PUBLICATIONS

English Translation of CN201480021790.X Notice of First Office Action dated Sep. 5, 2016; 10 Pages; Chinese Patent Office.
(Continued)

*Primary Examiner* — Mark A Osele
*Assistant Examiner* — Nickolas Harm

(57) ABSTRACT

A method of forming a laminated glass structure includes introducing a continuous ribbon of flexible glass substrate having a thickness of no greater than about 0.3 mm to a substrate material. The substrate material has a coefficient of thermal expansion (CTE) that is greater than that of the flexible glass substrate. The flexible glass substrate is laminated to the substrate material at an elevated temperature. The substrate material is cooled to introduce a compressive stress across a thickness of the flexible glass substrate.

13 Claims, 12 Drawing Sheets

(51) Int. Cl.

| | | |
|---|---|---|
| *B32B 17/06* | (2006.01) | |
| *B32B 17/10* | (2006.01) | |
| *B32B 37/06* | (2006.01) | |
| *B32B 37/08* | (2006.01) | |
| *B32B 37/10* | (2006.01) | |
| *B29C 44/06* | (2006.01) | |
| *B29C 35/02* | (2006.01) | |
| *B29C 44/24* | (2006.01) | |
| *B29C 43/30* | (2006.01) | |
| *B29C 43/52* | (2006.01) | |

(52) U.S. Cl.
CPC ........ *B32B 17/10036* (2013.01); *B32B 37/06* (2013.01); *B32B 37/08* (2013.01); *B32B 37/10* (2013.01); *B29C 35/0238* (2013.01); *B29C 35/0277* (2013.01); *B29C 43/30* (2013.01); *B29C 43/52* (2013.01); *B29C 44/06* (2013.01); *B29C 44/24* (2013.01); *B32B 2457/20* (2013.01)

(58) Field of Classification Search
USPC .................................. 156/163, 164, 212, 311
See application file for complete search history.

(56) References Cited

U.S. PATENT DOCUMENTS

| | | | |
|---|---|---|---|
| 3,682,609 | A | 8/1972 | Dockerty |
| 3,849,097 | A | 11/1974 | Giffen et al. |
| 6,270,605 | B1 | 8/2001 | Doerfler |
| 6,881,485 | B2 | 4/2005 | Kato et al. |
| 8,038,820 | B2 | 10/2011 | Kim et al. |
| 2004/0069770 | A1 | 4/2004 | Cary et al. |
| 2011/0026236 | A1 | 2/2011 | Kondo et al. |
| 2011/0081542 | A1 | 4/2011 | Pilloy et al. |
| 2011/0192525 | A1 | 8/2011 | Kondo et al. |
| 2011/0200804 | A1 | 8/2011 | Tomamoto et al. |
| 2011/0200805 | A1 | 8/2011 | Tomamoto et al. |
| 2011/0244225 | A1 | 10/2011 | Hattori et al. |
| 2011/0281093 | A1 | 11/2011 | Gulati et al. |
| 2012/0034435 | A1 | 2/2012 | Borrelli et al. |
| 2012/0094084 | A1 | 4/2012 | Fisher et al. |
| 2012/0094100 | A1 | 4/2012 | Takagi et al. |
| 2012/0128952 | A1 | 5/2012 | Miwa et al. |
| 2012/0249465 | A1 | 10/2012 | Lin et al. |
| 2015/0258750 | A1 | 9/2015 | Kang et al. |
| 2015/0336357 | A1 | 11/2015 | Kang et al. |

FOREIGN PATENT DOCUMENTS

| | | | |
|---|---|---|---|
| EP | 2204355 | A1 | 7/2010 |
| GB | 1319846 | A | 6/1973 |
| GB | 2074089 | A | 10/1981 |
| JP | 2005297498 | A | 10/2005 |
| JP | 2009165279 | A | 7/2009 |
| JP | 2010028882 | | 2/2010 |
| JP | 2010067344 | | 3/2010 |
| JP | 2010225434 | A | 10/2010 |
| JP | 2011023438 | A | 2/2011 |
| JP | 2011065672 | | 3/2011 |
| JP | 2011219352 | A | 11/2011 |
| JP | 2013014135 | A | 1/2013 |
| KR | 2002060659 | A | 7/2002 |
| KR | 2006059605 | A | 6/2006 |
| KR | 1180355 | B1 | 9/2012 |
| KR | 2012099018 | A | 9/2012 |
| WO | 79/00162 | A1 | 4/1979 |
| WO | 2004/089617 | A1 | 10/2004 |
| WO | 2005/058598 | A1 | 6/2005 |
| WO | 2005/059290 | A1 | 6/2005 |
| WO | 2006/034346 | A1 | 3/2006 |
| WO | 2014/035942 | A1 | 3/2014 |

OTHER PUBLICATIONS

International Search Report and Written Opinion of the International Searching Authority; PCT/US2014/033925; dated Nov. 13, 2014; 15 Pages; European Patent Office.

English Translation of CN201480021790.X Notice of Third Office Action dated Oct. 24, 2017; Chinese Patent Office; 13 pgs.

English Translation of TW1031134.9 Search Report dated Jul. 27, 2017, Taiwan Patent Office, 1 page.

ously shaped laminated glass structures, such as laminated glass sheets with curved, shaped, beveled, bezeled, or otherwise contoured profiles. Accordingly, there is a need for apparatuses and methods for forming laminated glass structures.

METHODS OF FORMING LAMINATED GLASS STRUCTURES

CROSS-REFERENCE TO RELATED APPLICATIONS

This application claims the benefit of priority under 35 U.S.C. § 371 of International Patent Application Serial No. PCT/US14/33925, filed on Apr. 14, 2014, which in turn, claims the benefit of priority of U.S. Provisional Patent Application Ser. No. 61/813,718, filed on Apr. 19, 2013, the contents of each of which are relied upon and incorporated herein by reference in their entireties.

FIELD

The present disclosure relates to glass-laminate structures and, more particularly, to methods of forming laminated glass structures.

BACKGROUND

Laminated glass structures may be used as components in the fabrication of various appliances, automobile components, architectural structures or electronic devices. For example, laminated glass structures may be incorporated as cover glass for various end products such as refrigerators, decorative glazing, televisions, or as embedded touch laminates for smart interactive displays. However, applications that utilize laminated glass structures are subject to strength and impact limitations. Additionally, some electronics require specially shaped laminated glass structures, such as laminated glass sheets with curved, shaped, beveled, bezeled, or otherwise contoured profiles. Accordingly, there is a need for apparatuses and methods for forming laminated glass structures.

SUMMARY

One technique to improve the mechanical reliability of flexible glass is to laminate, or bond, the flexible glass to one or more laminate materials or substrates. Flexible glass may be glass having a thickness of 300 microns or less, including but not limited to, 300, 275, 250, 225, 200, 190, 180, 170, 160, 150, 140, 130, 120, 110, 100, 90, 80, 70, 60, 50, 40, 30, 20, or 10 microns. Depending on the mechanical strength and impact resistance requirements of a laminated glass structure, as well as the expected bending stresses and direction of the intended application, a laminated glass structure can be designed to meet various mechanical requirements according to the concepts disclosed herein. When used properly, the laminated glass structures can offer improved mechanical reliability, and/or scratch, damage, or impact resistance performance over an unlaminated flexible glass.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, a method of forming a laminated glass structure, comprises:
 introducing a continuous ribbon of flexible glass substrate having a thickness of no greater than about 0.3 mm to a non-glass substrate material, the non-glass substrate material having a coefficient of thermal expansion (CTE) that is greater than that of the flexible glass substrate;
 laminating the flexible glass substrate to the non-glass substrate material at an elevated temperature; and
 cooling the laminated glass structure to introduce a compressive stress across a thickness of the flexible glass substrate.

According to a second aspect, there is provided the method of aspect 1, wherein the flexible glass substrate has a compressive strength of at least about 40 MPa across the thickness of the flexible glass substrate.

According to a third aspect, there is provided the method of aspect 1 or aspect 2, wherein the flexible glass substrate has a compressive stress of at least about 69 MPa across the thickness of the flexible glass substrate.

According to a fourth aspect, there is provided the method of any one of aspects 1-3, wherein the non-glass substrate material has a CTE that is at least about 10 times the CTE of the flexible glass substrate.

According to a fifth aspect, there is provided the method of any one of aspects 1-4, comprising expanding the non-glass substrate material relative to the flexible glass substrate as the substrate material is heated to the elevated temperature.

According to a sixth aspect, there is provided the method of any one of aspects 1-5, further comprising providing an adhesive layer between the flexible glass substrate and the non-glass substrate material that laminates the non-glass substrate material to the flexible glass substrate. The adhesive layer may be UV or pressure activated.

According to a seventh aspect, a method of forming a laminated glass structure comprises:
 shaping a pre-formed substrate into a non-planar shape, the pre-formed substrate comprising a non-glass material; and
 laminating a flexible glass substrate to the pre-formed substrate while the flexible glass conforms to the non-planar shape of the pre-formed substrate.

According to an eighth aspect, there is provided the method of aspect 7, wherein the non-glass material comprises a metal, metal alloy or polymer.

According to a ninth aspect, there is provided the method of aspect 7 or aspect 8, further comprising providing an adhesive layer between the flexible glass substrate and the pre-formed substrate.

According to a tenth aspect, there is provided the method of any one of aspects 7-9, wherein the step of shaping the pre-formed substrate comprises introducing the preformed substrate to a forming surface having a non-planar contour.

According to an eleventh aspect, there is provided the method of any one of aspects 7-10, wherein the step of laminating the flexible glass substrate to the pre-formed substrate comprises heating an adhesive layer located between the flexible glass substrate and the pre-formed substrate.

According to a twelfth aspect, there is provided the method of aspect 11, wherein the step of laminating the flexible glass substrate to the pre-formed substrate comprises applying an external pressure to one or both of the flexible glass substrate and the pre-formed substrate.

According to a thirteenth aspect, there is provided the method of aspect 11 or aspect 12, wherein the adhesive layer is both heated and cooled while the external pressure is applied to the one or both of the flexible glass substrate and the pre-formed substrate.

According to a fourteenth aspect, a method of forming a laminated glass structure comprises:
  forming a substrate stack including a layer of a flexible glass substrate, a layer of a pre-formed substrate comprising a non-glass material and a layer of an adhesive material located between the flexible glass substrate and the pre-formed substrate;
  introducing the substrate stack to a pressure zone; and
  applying pressure to the substrate stack within the pressurized zone while the substrate stack is both heated and then cooled.

According to a fifteenth aspect, there is provided the method of aspect 14, wherein the non-glass material comprises a metal, metal alloy or polymer.

According to a sixteenth aspect, there is provided the method of aspect 14 or aspect 15, comprising introducing the flexible glass substrate to the pre-formed substrate as a continuous ribbon of the flexible glass substrate.

According to a seventeenth aspect, there is provided the method of any one of aspects 14-16, comprising introducing the pre-formed substrate to the flexible glass ribbon as a continuous ribbon of the flexible glass substrate.

According to an eighteenth aspect, there is provided the method of any one of aspects 14-17, comprising introducing the adhesive material to one or both of the flexible glass substrate and the pre-formed substrate as a continuous ribbon of the adhesive material.

According to a nineteenth aspect, there is provided the method of any one of aspects 14-18, further comprising introducing the substrate stack to the pressure zone as a continuous ribbon of the substrate stack.

According to a twentieth aspect, there is provided the method of any one of aspects 14-19, further comprising shaping the pre-formed substrate comprises introducing the preformed substrate to a forming surface having a non-planar contour.

According to a twenty-first aspect, there is provided the method of any one of aspects 14-20, wherein at least part of the pressurized zone is formed between a pair of heated pressure rollers.

According to a twenty-second aspect, there is provided the method of any one of aspects 14-21, wherein at least part of the pressurized zone is formed between a pair of cooled pressure rollers.

According to a twenty-third aspect, there is provided the method of any one of aspects 14-22, wherein at least part of the pressurized zone is formed between both a pair of heated pressure rollers and a pair of cooled pressure rollers.

According to a twenty-fourth aspect, there is provided the method of any one of aspects 14-23, further comprising shaping the pre-formed substrate into a non-planar shape.

According to a twenty-fifth aspect, there is provided the method of aspect 24, wherein the step of forming the substrate stack comprises laminating the flexible glass substrate to the pre-formed substrate while conforming the flexible glass to the non-planar shape of the preformed substrate.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
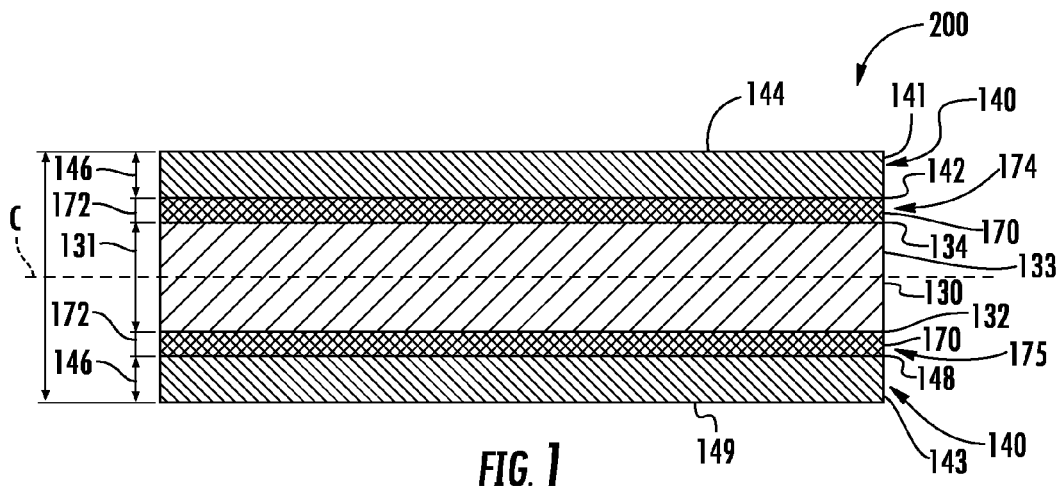
FIG. 1 illustrates a cross-sectional view of one embodiment of a symmetric laminated glass structure in accordance with aspects of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, Bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Although glass is an inherently strong material, its strength and mechanical reliability is a function of its surface defect or flaw size density distribution and the cumulative exposure of stress to the material over time. During an entire product life cycle, a laminated glass structure may be subjected to various kinds of static and dynamic mechanical stresses. Embodiments described herein generally relate to methods of forming laminated glass structures where flexible glass may be strengthened using a non-glass substrate. Particular examples discussed herein relate to laminated glass structures where the non-glass substrate is a polymer and/or metal or metal alloy, such as stainless steel, aluminum, nickel, magnesium, brass, bronze, titanium, tungsten, copper, cast iron or a noble metal. In some embodiments, a relatively large coefficient of thermal expansion (CTE) mismatch between the non-glass substrate and the flexible glass may be utilized to improve strength by laminating the non-glass substrate to the flexible glass sheet at an elevated lamination temperature (e.g., greater than about 100° C.) followed by a controlled cooling. Such an elevated lamination temperature approach can create a uniformly distributed compressive residual stress across the thickness of the flexible glass sheet once the laminated glass structure is cooled.

In some embodiments, a continuous process is developed for strengthening flexible glass substrates that utilizes a large CTE mismatch (e.g., about 2 times or more, such as about 5 times or more, such as about 10 times or more) between the non-glass substrate and the flexible glass substrate by laminating the non-glass substrate and the flexible glass substrate at an elevated temperature and then slowly cooling to create a residual compressive stress across the thickness of the flexible glass substrate. In some embodiments, the CTE mismatch may be at least about 3 ppm/° C. or more, such as about 6 ppm/° C. or more, such as about 9 ppm/° C. or more, such as about 12 ppm/° C. or more, such as about 15 ppm/° C. or more, such as about 20 ppm/° C. or more, such as about 27 ppm/° C. or more, such as about 50 ppm/° C. or more.

Figure 2:
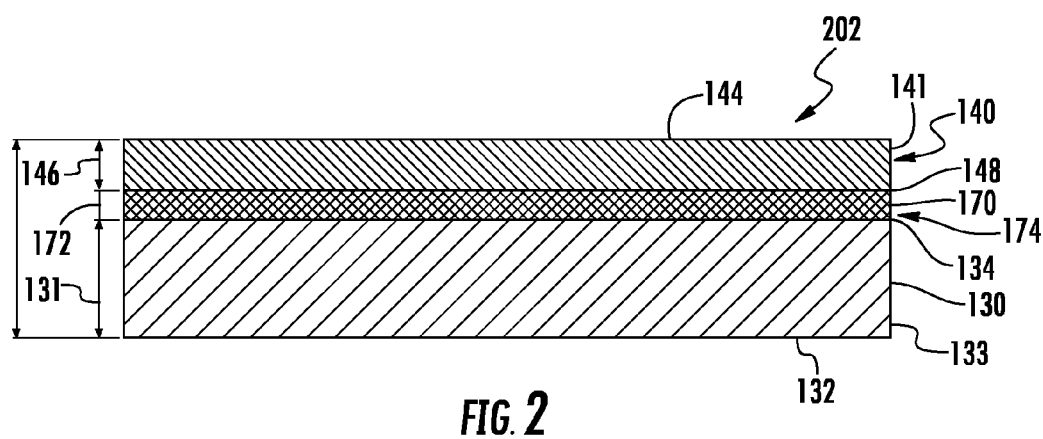
FIG. 2 illustrates a cross-sectional view of one embodiment of an asymmetric laminated glass structure in accordance with aspects of the disclosure.

Referring to FIGS. 1 and 2, cross-sectional views of two exemplary laminated glass structures 200 and 202 are illustrated. Referring first to FIG. 1, the laminated glass structure 200 is generally referred to as a symmetric laminated glass structure and includes a first outermost flexible glass layer 141 that is formed of a flexible glass sheet 140, a second outermost flexible glass layer 143 that is formed of another flexible glass sheet 140 and a non-glass substrate layer 133 that is sandwiched between and laminated to the first and second flexible glass layers 141 and 143. A symmetric laminated glass structure 200, shown in FIG. 1, is constructed such that the layers below a central plane C of the laminated glass structure 200 form a mirror image of the layers above the central plane C, while asymmetric laminated glass structures, as shown in FIG. 2, do not have such a mirror image about their central planes. The non-glass substrate layer 133 is formed of a non-glass substrate 130, such as polymer, metal alloys such as stainless steel, copper, nickel, brass, bronze, titanium, tungsten, cast iron, aluminum, ceramic, composite, or another polymer or rigid material or combinations of these materials. In many embodiments, the non-glass substrate 130 is formed of a metal or metal alloy.

The non-glass substrate 130 may be formed using a polymer material, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

Adhesive layers 174, 175, may be formed of an adhesive material 170 that may be used to laminate the first and second flexible glass layers 141, 143 to the non-glass substrate layer 133 at the interfaces between their respective broad surfaces 134, 142 and 132, 148. The adhesive material 170 may be a non-adhesive interlayer, an adhesive, a sheet or film of adhesive, a liquid adhesive, a powder adhesive, a pressure sensitive adhesive, an ultraviolet light adhesive, a thermal adhesive, or other similar adhesive or combination thereof. The adhesive material 170 may assist in attaching the flexible glass 140 to the non-glass substrate 130 during lamination. Some examples of low temperature adhesive materials 170 include Norland 68 cured by UV, 3M OCA 8211 and 8212 (bonded by pressure at room temperature), silicones, acrylates, optically clear adhesives, encaptulant material, polyurethane and wood glues. Some examples of higher temperature adhesive materials 170 include DuPont SentryGlas, DuPont PV 5411, Japan World Corporation material FAS and polyvinyl butyral resin. The adhesive layer 174 may be thin, having a thickness less than or equal to about 1000 µm, including less than or equal to about 500 µm, about 250 µm, less than or equal to about 50 µm, less than or equal to about 25 µm, and between about 0.1 mm and about 5 mm. The adhesives may also contain other functional components such as color, decoration, heat or UV resistance, AR filtration etc. The adhesive material 170 may be optically clear on cure, or may otherwise be opaque. In embodiments where the adhesive material 170 is a sheet or film of adhesive, the adhesive material 170 may have a decorative pattern or design visible through the thickness of the flexible glass, as shown in FIG. 3.

Figure 3:
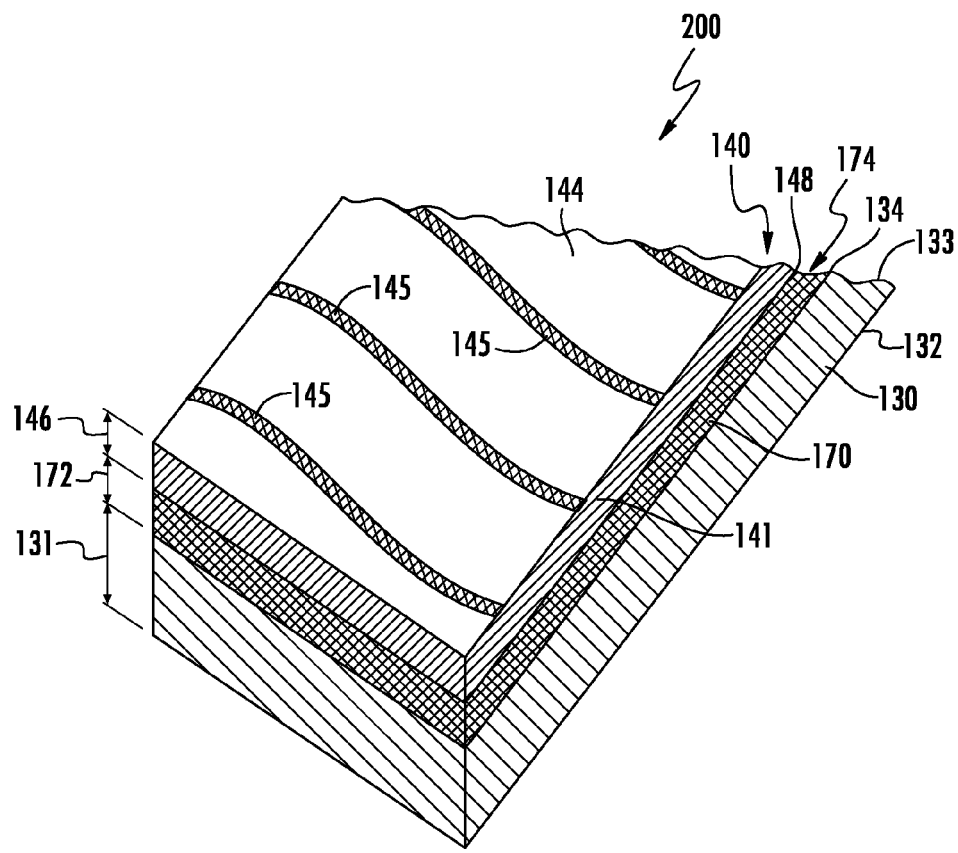
FIG. 3 depicts a cross-sectional view of the symmetric laminated glass structure of FIG. 1 with a decorative pattern on an adhesive layer in accordance with aspects of the disclosure.

In FIG. 3, the laminated glass structure 200 includes an adhesive layer 174 formed of a sheet or film of adhesive material 170. The adhesive material 170 has a pattern of stripes 145 that are visible from the outer surface 144 of the flexible glass layer 141. Some air bubbles may become entrained in the laminated glass structure during or after lamination, but air bubbles having a diameter of equal to or less than 100 µm may not affect the impact resistance of the laminated glass structure. Formation of air bubbles may be reduced by use of a vacuum system or application of pressure to a surface of the structure. In other embodiments, the flexible glass layer may be laminated without adhesive. In yet some other embodiments, the second flexible glass layer 143 may be formed of a flexible glass having a chemical composition different than the flexible glass sheet 140 of the first flexible glass layer 141. Manipulation of the bond strength between layers 141, 174, 133 of the laminated glass structure may also affect the impact resistance of the laminated glass structure.

Figure 4:
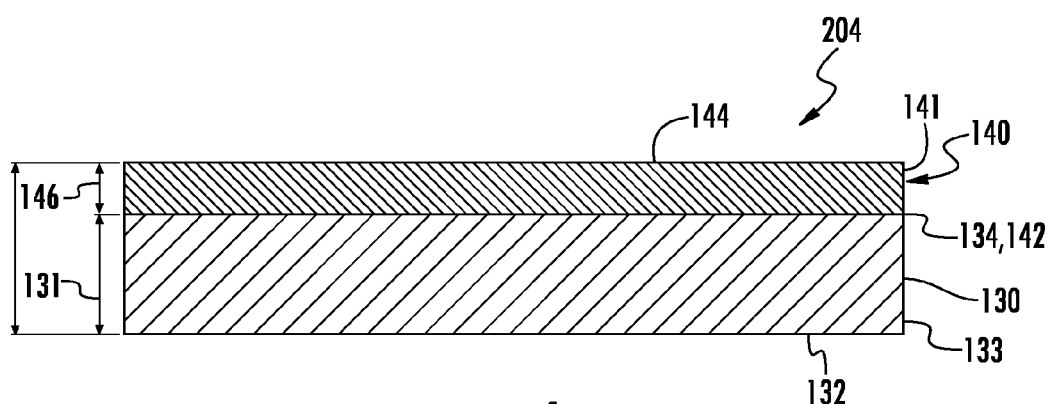
FIG. 4 depicts a cross-sectional view of one embodiment of an asymmetric laminated glass structure without an adhesive layer in accordance with aspects of the disclosure.

While FIG. 1 illustrates outermost flexible glass layers 141, 143 in a symmetric laminated glass structure 200, FIG. 2 illustrates an alternative laminated glass structure 202 with only a first outermost flexible glass layer 141 laminated to a non-glass substrate layer 133, generally referred to as an asymmetric laminated glass structure. Again, an adhesive layer 174 may be used to laminate the first outermost flexible glass layer 141 to the non-glass substrate layer 133 at the interfaces between their respective broad surfaces 134, 142. FIG. 4 illustrates another laminated glass structure 204 including a first outermost flexible glass layer 141 laminated to a non-glass substrate layer 133 without the adhesive layer 174. FIGS. 1-4 illustrate exemplary laminated glass structures with a number of layers, however, other laminated glass structures having more or less layers may be utilized.

The flexible glass sheet 140 may have a thickness 146 of about 0.3 mm or less including but not limited to thicknesses of, for example, about 0.01-0.05 mm, about 0.05-0.1 mm, about 0.1-0.15 mm, about 0.15-0.3 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass sheet 140 may be formed of glass, a glass ceramic, a ceramic material or composites thereof. A fusion process (e.g., downdraw process) that forms high quality flexible glass sheets can be used in a variety of devices and one such application is flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw, down draw, and slot draw methods. Additionally, the flexible glass sheet 140 may also contain anti-microbial properties by using a chemical composition for the glass including an Ag ion concentration on the surface in the range greater than 0 to 0.047 µg/cm$^2$, further described in U.S. Patent Application Publication No. 2012/0034435 A1. The flexible glass 140 may also be coated with a glaze composed of silver, or otherwise doped with silver ions, to gain the desired anti-microbial properties, further described in U.S. Patent Application Publication No. 2011/0081542 A1. Additionally, the flexible glass 140 may have a molar composition of 50% $SiO_2$, 25% CaO, and 25% $Na_2O$ to achieve the desired anti-microbial effects.

Figure 5:
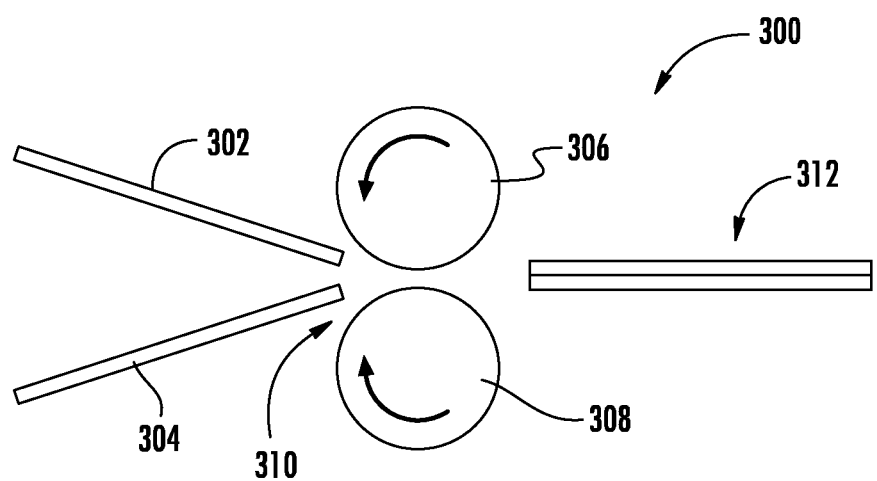
FIG. 5 illustrates schematically an embodiment of a process and apparatus for forming a laminated glass structure.
Figure 6:
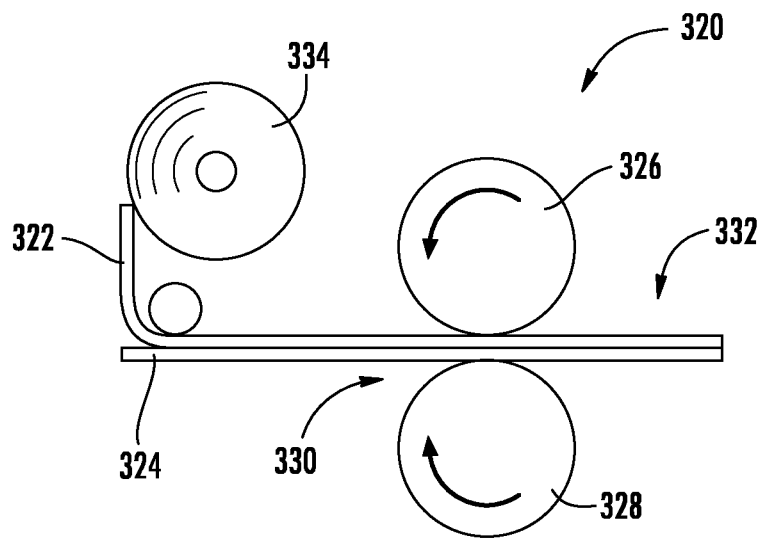
FIG. 6 illustrates schematically another embodiment of a process and apparatus for forming a laminated glass structure.
Figure 7:
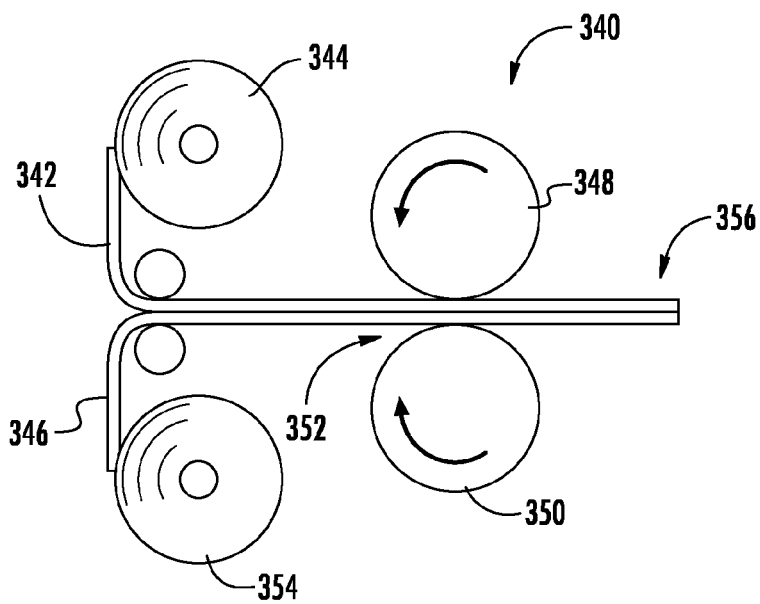
FIG. 7 illustrates schematically another embodiment of a process and apparatus for forming a laminated glass structure.

FIGS. 5-7 illustrate schematically processes and apparatus for forming various laminated glass structures. Referring first to FIG. 5, a sheet-to-sheet lamination method 300 is illustrated where pressure is used to bond a flexible glass sheet 302 to a substrate sheet 304. In this embodiment, pressure rollers 306 and 308 form a nip 310 to which the flexible glass sheet 302 and the substrate sheet 304 are delivered. In some embodiments, an adhesive may be provided between the flexible glass sheet 302 and the substrate sheet 304 as they are simultaneously delivered to the nip 310. Pressure in the nip 310 is used to form a laminated glass structure 312. Heated rollers 306 and 308 may be used to utilize a CTE mismatch between the flexible glass sheet 302 and the substrate sheet 304 in order to introduce a compressive stress across the thickness of the flexible glass sheet 302 to strengthen the flexible glass sheet 302 upon cooling. Referring to FIG. 6, a roll-to-sheet lamination method 320 is illustrated where; again, pressure is used to bond a continuous ribbon 322 of flexible glass from supply roll 334 to a substrate sheet 324. In this embodiment, pressure rollers 326 and 328 (e.g., heated or unheated) form a nip 330 to which the continuous ribbon 322 of flexible glass and the substrate sheet 324 are delivered. In some embodiments, an adhesive may be provided between the continuous ribbon 322 of flexible glass and the substrate sheet 324 as they are simultaneously delivered to the nip 330. Pressure in the nip 330 is used to form a laminated glass structure 332. Referring to FIG. 7, a roll-to-roll lamination method 340 is illustrated where pressure is used to bond a continuous ribbon 342 of flexible glass from supply roll 344 to a continuous ribbon 346 of substrate material from supply roll 354. In this embodiment, pressure rollers 348 and 350 form a nip 352 to which the continuous ribbon 342 of flexible glass and the continuous ribbon 346 of substrate material are delivered. In some embodiments, an adhesive may be may be provided between the continuous ribbon 342 of flexible glass and the continuous ribbon 346 of substrate material as they are simultaneously delivered to the nip 353. Pressure in the nip 352 is used to form a laminated glass structure 356.

Figure 8:
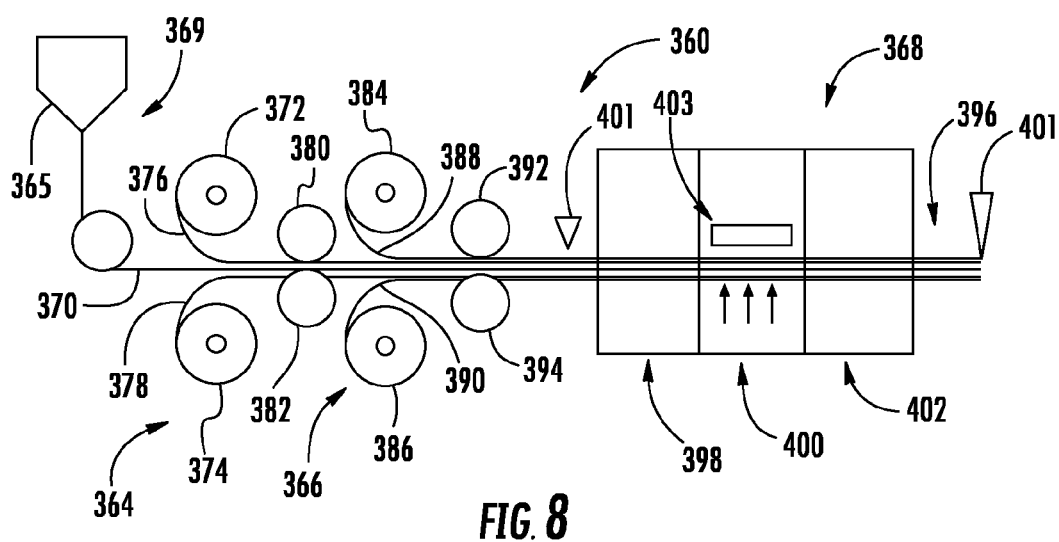
FIG. 8 illustrates schematically an embodiment of a process and apparatus for forming a laminated glass structure using roll-to-roll lamination.

Referring now to FIGS. 8-12, exemplary apparatus and processes for forming laminated glass structures using roll-to-roll lamination are illustrated schematically. Referring to FIG. 8, apparatus 360 includes a substrate forming stage 369, an adhesive applying stage 364, a flexible glass applying stage 366 and a lamination stage 368. The substrate forming stage 369 may include a source 365 (e.g., roll, extruder, etc.) of substrate material (e.g., plastic and/or metal) forming a continuous ribbon 370 of the substrate material. Selection of the substrate material may affect the material properties of the laminated glass structure. For example, selecting a substrate material with a higher CTE α may affect the strength of the laminated glass structure by inducing a compressive stress across a thickness of the flexible glass and reducing tensile stress. The compressive stress may increase the impact resistance of the laminated glass structure. A substrate material with a CTE α value significantly greater, such as two times or three times greater, than the CTE α value of the flexible glass may increase the compressive stress in the flexible glass. Additionally, the rigidity of the substrate material may affect the bending stress of the laminated glass structure. For example, if the substrate material has a high rigidity, the laminated glass structure may have a reduced bending stress.

The continuous ribbon 370 of substrate material may be delivered to the adhesive applying stage 364 for application of an adhesive material. In this embodiment, the adhesive applying stage 364 includes supply rolls 372 and 374 that supply continuous ribbons 376 and 378 of the adhesive material to opposite surfaces of the continuous ribbon 370 of substrate material. Alternatively, any other method and adhesive material form may be applied to the continuous ribbon 370 of substrate material. Pressure rollers 380 and 382 (e.g., heated or unheated) may be provided for initiating bonding between the continuous ribbon 370 of substrate material and the continuous ribbons 376 and 378 of adhesive material. The flexible glass applying stage 366 includes supply rolls 384 and 386 that supply continuous ribbons 388 and 390 of flexible glass to the opposite surface of the continuous ribbon 370 of substrate material such that the adhesive material can be used to laminate the continuous ribbons 388 and 390 of flexible glass to the continuous ribbon 370 of substrate material. Pressure rollers 392 and 394 may be provided for initiating bonding between the continuous ribbon 370 of substrate material and the continuous ribbons 388 and 390 of flexible glass. The lamination stage 368 may utilize heat and pressure to form a continuous laminated glass structure 396. The lamination stage 368 may include a heating station 398, a vacuum station 400 and a cooling station 402. A vacuum may be applied using a vacuum device 403 to provide pressure for forming the continuous laminated glass structure 396. A cutting device 401 may be provided for cutting or otherwise separating sections of laminated glass structure 396 from the continuous laminated glass structure 396. The cutting operation may take place after lamination or before entering the lamination stage 368 (see dotted lines 401).

Figure 9:
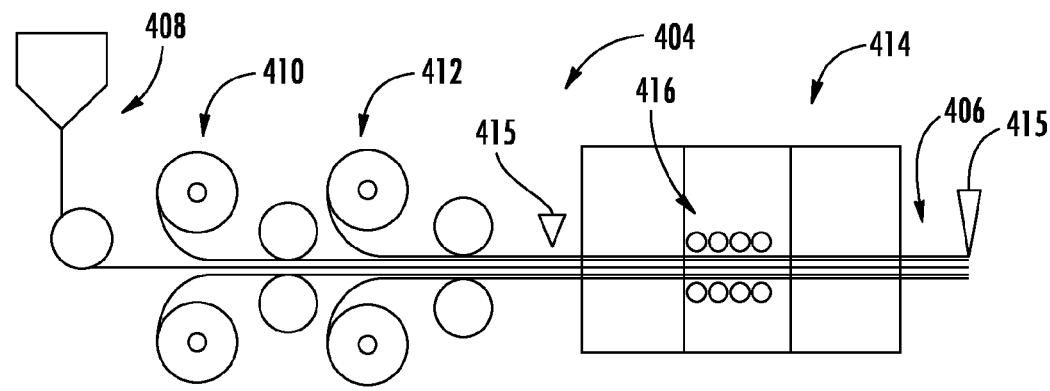
FIG. 9 illustrates schematically another embodiment of a process and apparatus for forming a laminated glass structure using roll-to-roll lamination.

FIG. 9 illustrates an alternative embodiment of a method and apparatus 404 for forming a laminated glass structure 406 that includes many of the elements and features described above with reference to apparatus 360 including a substrate forming stage 408, an adhesive applying stage 410, a flexible glass applying stage 412, a lamination stage 414 and a cutting device 415. In this exemplary embodiment, however, pressure rollers 416 are used along with heat and controlled cooling in forming the laminated glass structure 406.

Figure 10:
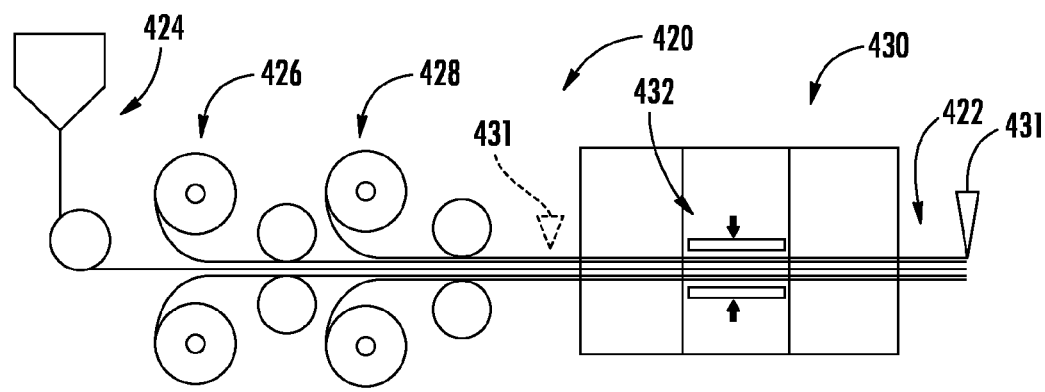
FIG. 10 illustrates schematically another embodiment of a process and apparatus for forming a laminated glass structure using roll-to-roll lamination.

FIG. 10 illustrates another alternative embodiment of a method and apparatus 420 for forming a laminated glass structure 422 that includes many of the elements and features described above with reference to apparatus 360 including a substrate forming stage 424, an adhesive applying stage 426, a flexible glass applying stage 428, a lamination stage 430 and a cutting device 431. In this exemplary embodiment, however, platens 432 are used along with heat and controlled cooling in forming the laminated glass structure 422.

Figure 11:
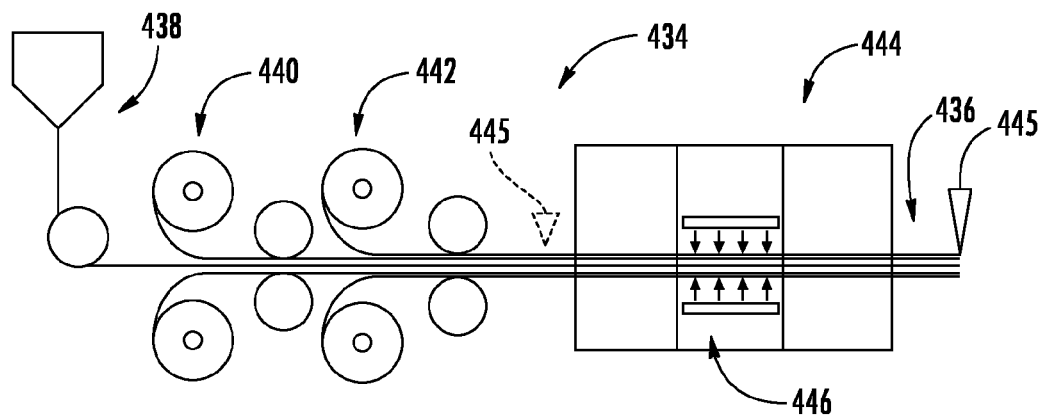
FIG. 11 illustrates schematically another embodiment of a process and apparatus for forming a laminated glass structure using roll-to-roll lamination.

FIG. 11 illustrates another alternative embodiment of a method and apparatus 434 for forming a laminated glass structure 436 that includes many of the elements and features described above with reference to apparatus 360 including a substrate forming stage 438, an adhesive applying stage 440, a flexible glass applying stage 442, a lamination stage 444 and a cutting device 445. In this exemplary embodiment, however, pressurized air (or inert gas) from pressurized air (or inert gas) source 446 is used to supply lamination pressure along with heat and controlled cooling in forming the laminated glass structure 436.

Figure 12:
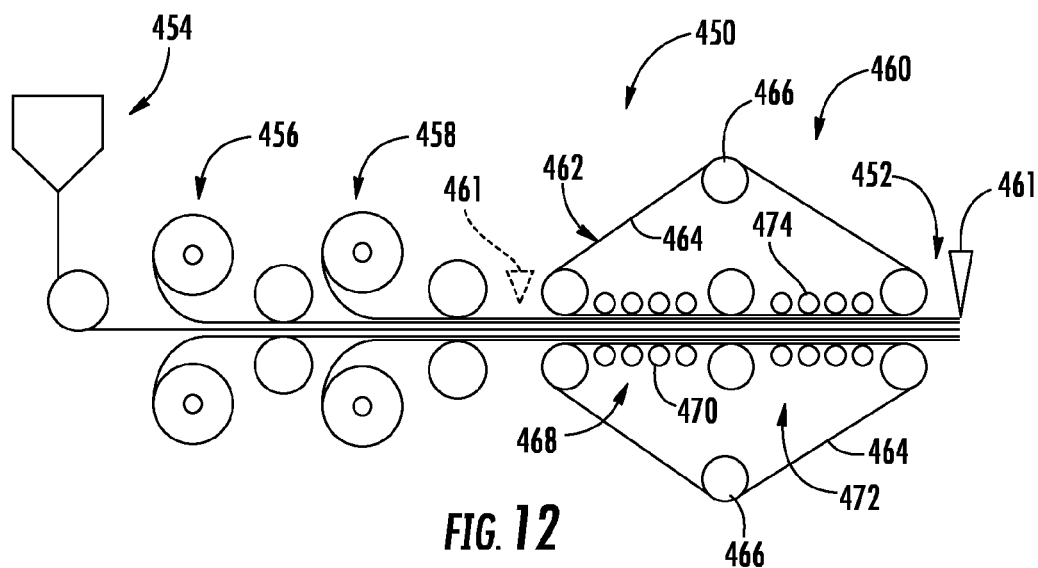
FIG. 12 illustrates schematically another embodiment of a process and apparatus for forming a laminated glass structure using roll-to-roll lamination.

FIG. 12 illustrates yet another alternative embodiment of a method and apparatus 450 for forming a laminated glass structure 452 that includes many of the elements and features described above with reference to apparatus 360 including a substrate forming stage 454, an adhesive applying stage 456, a flexible glass applying stage 458, a lamination stage 460 and a cutting device 461. In this exemplary embodiment, however, a belt assembly 462 is used to supply lamination pressure along with heat in forming the laminated glass structure 452. The belt assembly 462 may include a belt 464 that is located about drive rolls 466. A heated roller assembly 468 may include one or more heated pressure rollers 470 that can be used to simultaneously heat and apply lamination pressure. A cooled roller assembly 472 may include one or more cooled pressure rollers 474 for cooling and forming the laminated glass structure 452.

While larger compressive stresses (e.g., about 30 MPa or more, such as about 40 MPa or more, such as about 50 MPa or more, such as about 60 MPA or more, such as about 69 MPa or more such as about 80 MPa or more, such as about 90 MPA or more, such as about 100 MPa or more, such as about 110 MPa or more) may be desired across the thickness of the flexible glass substrates, there are limits on the amount of compressive stress that can be introduced. For example, to achieve large compressive stresses in the flexible glass substrate, one approach is to set the lamination temperature as high as possible. However, the upper end of this lamination temperature should not exceed limits set by specific properties of the flexible glass-polymer laminate materials, such as the working temperature limit of any adhesive used. Material and structural integrity should be considered in insuring product reliability. Thus, various limits may affect the amount of compressive stress that can be introduced to the flexible glass substrate.

Figure 13:
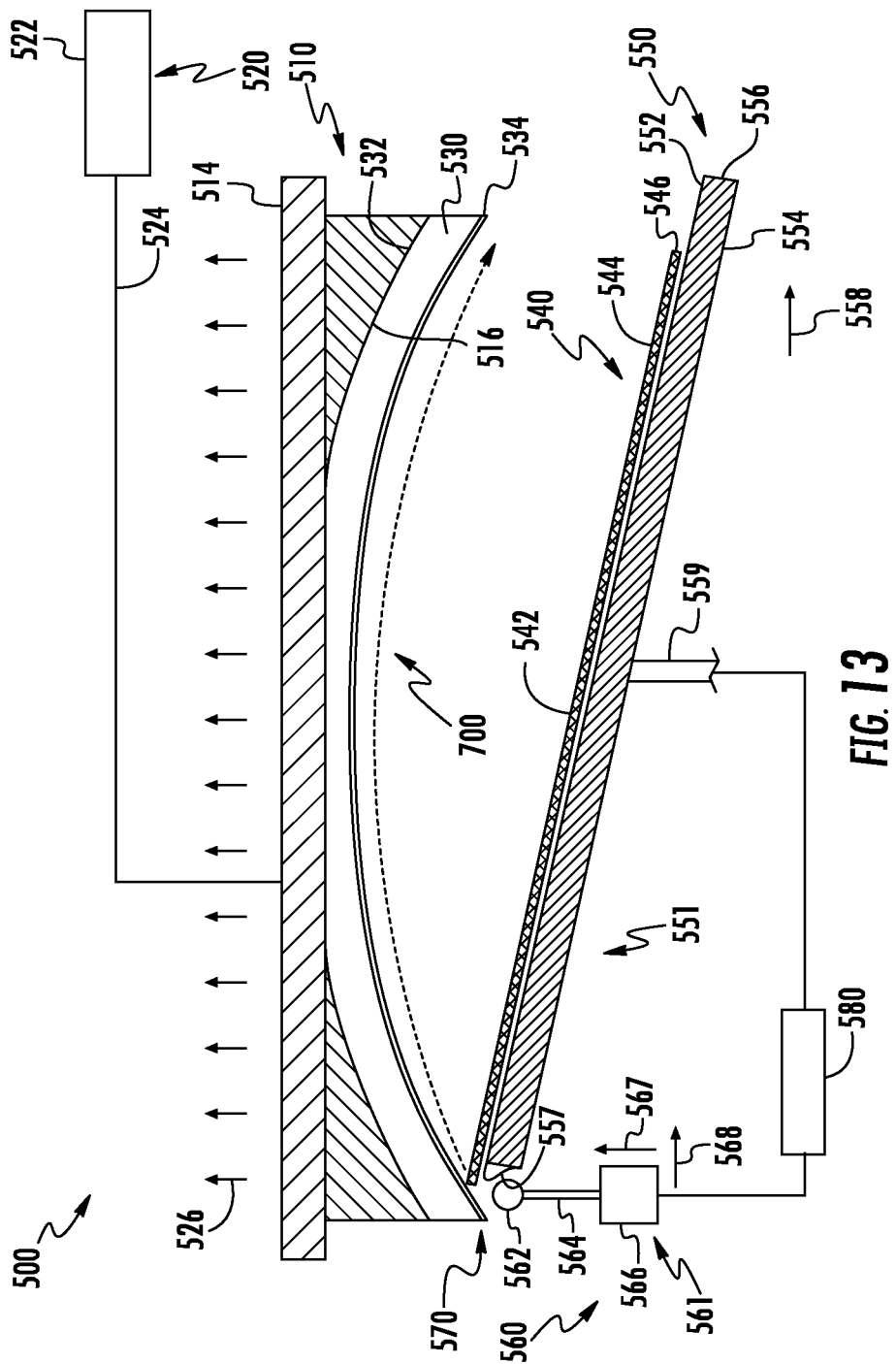
FIGS. 13 and 14 illustrate schematically an embodiment of a method and apparatus for forming a laminated glass structure.
Figure 14:
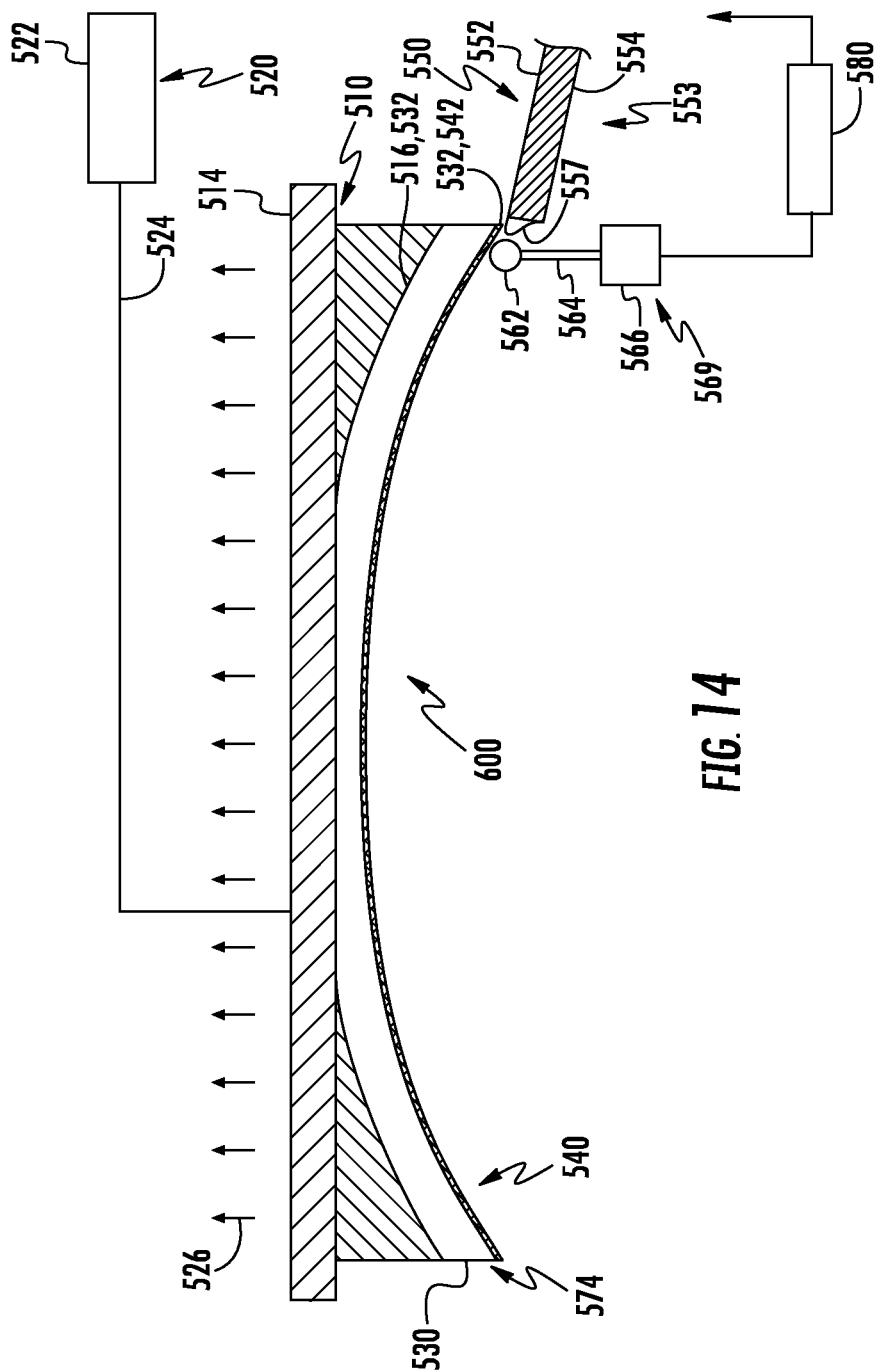

While many of the above methods and apparatus can be used for continuous lamination structure formation, referring now to FIGS. 13 and 14, a schematic cross-sectional view of one embodiment of a laminated glass structure forming apparatus 500 is illustrated that can be used in a discontinuous fashion using sheets of flexible glass. The laminated glass structure forming apparatus 500 includes a vacuum mold 510, and a vacuum system 520. A pre-formed laminate material 530 is located in the vacuum mold 510. A dynamic delivery stage 550 and programmable roller assembly 560 are also included in this embodiment of the laminated glass structure forming apparatus 500. Other embodiments of the laminated glass structure forming apparatus 500 may include only some or more than of these elements. Although shown in one orientation in FIG. 13, it is to be understood the laminated glass structure forming apparatus 500 may be oriented in an "upside-down," vertical, or angled orientation.

The vacuum assembly 520 may be connected to the vacuum mold 510 in any suitable fashion such as by line 524 and may pull or push air or another gas through the vacuum mold 510 to create a vacuum environment near a surface 516 of the vacuum mold 510. The pre-formed laminate material 530 may be positioned proximate to or in the vacuum mold 510 and may be secured to the vacuum mold 510 by the vacuum environment near the surface 516 of the vacuum mold 510 created by the vacuum assembly 520. In some embodiments, the pre-formed laminate material 530 may be heated before, during, and/or after its delivery to the vacuum mold 510. A flexible glass 540 may be fed to the laminated glass structure forming apparatus 500 by the dynamic delivery stage 550, or from a spool, as discussed below. In one embodiment, the dynamic delivery stage 550 may deliver the flexible glass 540 near the pre-formed laminate material 530. When the flexible glass 540 is proximate to the pre-formed laminate material 530, the programmable roller assembly 560 may approach the vacuum mold 510 at a trailing edge 557 of the dynamic delivery stage 550. The programmable roller assembly 560 may then trail the dynamic delivery stage 550 at a velocity and angle corresponding to the dynamic delivery stage 550. As the programmable roller assembly 560 follows the dynamic delivery stage 550 along an actuation path, the programmable roller assembly 560 may apply a pressure to the flexible glass 540, aiding the flexible glass 540 to contact the pre-formed laminate material 530, thereby laminating the flexible glass 540 to the pre-formed laminate material 530 and forming a laminated glass structure 600 (shown in FIG. 14) with appropriate engineered compressive stress induced through the thickness of the flexible glass 540 utilizing the CTE $\alpha$ mismatch and/or impact resistance enhancement mechanisms. In some instances, the laminated glass structure 600 may be asymmetrical, with flexible glass 540 laminated to one surface of the pre-formed laminate material 530. In other instances, the laminated glass structure 500 may be symmetrical, with flexible glass 540 laminated to one surface or opposite surfaces of the pre-formed laminate material 530. The laminated glass structure 600 may have increased strength, durability, and impact resistance due to any induced compressive stress in the flexible glass 540, as well as the material properties of the flexible glass 540 and the pre-formed laminate material 530. It should be noted that along with the vacuum system 520 to hold the pre-formed laminate in the mold, an air-bearing system or like could be designed in to avoid direct contact of preformed surface to the vacuum mold system 510. Also, a compressed air or gas feed system (not shown) may be coupled in to the vacuum mold system 510.

Still referring to FIG. 13, the vacuum mold 510 may have a perforated or porous first surface 514 and the perforated or porous forming surface 516, where holes or openings extend from the first surface 514 through the vacuum mold 510 to the forming surface 516. The holes or openings may allow air or another gas to be pushed or pulled, along the entire surface or along certain discrete segments of the surface, from the first surface 514 of the vacuum mold 510 to the forming surface 516 of the vacuum mold 510. In the embodiment depicted in FIG. 13, the vacuum assembly 520 is attached to the vacuum mold 510 by the connection line 524. The vacuum assembly 520 includes a vacuum device 522 that pulls air from the forming surface 516 of the vacuum mold 510 through the width 512 of the vacuum mold 520 towards the first surface 514 of the vacuum mold 510 in a general direction 526. The said coupled compressed air or gas assembly, not shown, may also push air from the first surface 514 of the vacuum mold 510 to the forming surface 516 of the vacuum mold 510 in a direction generally opposite to direction 526 during or after lamination is complete. This increased air pressure at surface 516 may also allow the laminated glass structure 600 to be easily released from the vacuum mold 510.

The holding and/or forming surface 516 of the vacuum mold 510 may be of various complex shapes, such as a shape having one or more curves or undulations, or a curve including a full or partial flat section, a three-dimensional contour, or any other non-planar contours. The forming surface 516 of the vacuum mold 510 may be constructed of metal, porous metal, ceramic, porous ceramic, polymer, porous polymer or composites thereof, or any other material selected so as to avoid damaging the pre-formed laminate material 530. The selection of material for the forming surface 516 of the vacuum mold 510 may affect the ability of the pre-formed laminate material 530 to be placed near or into the vacuum mold 510 or the ability of the laminated glass structure 600 to be removed from the vacuum mold 510.

The vacuum mold 510 may be a one-piece mold, a two-piece mold, or may have other pieces that attach to the forming surface 516 to create multiple complex shapes and be otherwise reusable. The body of the vacuum mold 510 may be constructed of any solid material such as glass, ceramic, metal, wood, polymer and/or a composite.

The pre-formed laminate material 530 is placed near or into the vacuum mold 510. The pre-formed laminate material 530 has a first surface 532 and a second surface 534. The pre-formed laminate material 530 is positioned such that the first surface 532 of the pre-formed laminate material 530 is in contact with the forming surface 516 of the vacuum mold 510. The pre-formed laminate material 530 may be constructed of glass, including glass identical to the flexible glass 540, wood, glass ceramic, metal such as stainless steel or aluminum, ceramic, composite, or another polymer or rigid material. Rigidity is determined herein by the Young's modulus measurement of the material. An exemplary rigid material is aluminum, with a Young's modulus of 70,000 MPa, or stainless steel, with a Young's modulus of 200,000 MPa.

Selection of the pre-formed laminate material 530 may affect the material properties of the laminated glass structure 600. For example, selecting a pre-formed laminate material with a higher CTE $\alpha$ may affect the strength of the laminated glass structure 600 by inducing a compressive stress across a thickness 546 of the flexible glass 540 and reducing tensile stress. The compressive stress may increase the impact resistance of the laminated glass structure 600. A pre-formed laminate material 530 with a CTE $\alpha$ value significantly greater, such as two times or three times greater, than the CTE $\alpha$ value of the flexible glass 540 may increase the compressive stress in the flexible glass 540. Additionally, the rigidity of the pre-formed laminate material 530 may affect the bending stress of the laminated glass structure 600. For example, if the pre-formed laminate structure 600 has a high rigidity, the laminated glass structure 600 may have a reduced bending stress.

The pre-formed laminate material 530 may have adhesive material 570 on the first and second surface 532, 534, as shown in FIG. 14, forming one or more adhesive layers 574. The adhesive material 570 may assist in attaching the flexible glass 540 to the pre-formed laminate material 530 during lamination. Some examples of adhesive material 570 are commercially available as Norland 68, 3M OCA 8211, 3M 8212, DuPont SentryGlas, DuPont PV 5411, silicones, acrylates, Japan World Corporation material FAS, encaptulant material, polyurethane, polyvinyl butyral resin, wood glue or like, or another optically clear adhesive. The adhesive layer 574 may be thin, having a thickness less than or equal to 500 µm, including less than or equal to 250 µm, less than or equal to 50 µm, less than or equal to 25 µm, and sub-micron thicknesses. If the adhesive layer 574 is substantially clear, the second surface 534 of the pre-formed laminate material 530 may be visible from a second surface 544 of the flexible glass 540. The adhesive material 570 may also be UV curable, heat activated, or pressure sensitive adhesive. The adhesives may contain other functional components such as color, decoration, heat or UV resistance, AR filtration etc.

The flexible glass 540 to be laminated to the pre-formed laminate material 530 may be delivered to the pre-formed laminate material 530 by the dynamic delivery stage 550. In other embodiments, the flexible glass 540 may be delivered via a continuous flexible glass spool, as discussed below. The flexible glass 540 is "ultrathin" and has a thickness 546 (See FIGS. 1 and 2) of less than or equal to about 0.3 mm, as discussed above. The flexible glass 540 may be temporarily and/or permanently bonded to a film, uncoated or coated with functional material such as display touch materials. The flexible glass 540 is positioned such that the first surface 542 of the flexible glass 540 is proximate to the second surface 534 of the pre-formed laminate material 530, and the second surface 544 of the flexible glass 540 may be in contact with the dynamic delivery stage 550.

The dynamic delivery stage 550 includes a delivery surface 552, an actuating surface 554, a leading edge 556, and the trailing edge 557. The dynamic delivery stage 550 includes an actuation mechanism 559 connected to the actuating surface 554 of the dynamic delivery stage 550. The dynamic delivery stage 550 delivers the flexible glass 540 to the pre-formed laminate material 530. The flexible glass 540 is positioned on the delivery surface 542, such that the second surface 544 of the flexible glass 540 is in contact with or positioned proximate to the delivery surface 552 of the dynamic delivery stage 550. A coating such as Teflon or another friction-reducing or friction-free material may be included on the delivery surface 552 so as to avoid damage to the flexible glass 540 by the delivery surface 552 and to allow the flexible glass 540 to transition to the pre-formed laminate material 540 in a smooth manner. The delivery surface 552 may also be air-bearing, thereby avoiding or otherwise limiting direct contact with the flexible glass 540. In some embodiments, the dynamic delivery stage 550 may be formed of a flexible, resilient material such as polymers, plastics, rubber, etc. In other embodiments, the dynamic delivery stage 550 may be formed of rigid materials such as polymers, plastics, metals, etc. The trailing edge 557 of the dynamic delivery stage 550 may be contoured, curved or otherwise designed so as to avoid a hard corner or edge coming into contact with the flexible glass 540 as the flexible glass 540 leaves the delivery surface 552 and is laminated to the preformed laminate material 530 to form the laminated glass structure 600.

In the embodiment shown in FIG. 13, the dynamic delivery stage 550 may actuate in a general direction 558, such that the leading edge 556 is in advance of the trailing edge 557. The dynamic delivery stage 550 has an initial position 551 where the trailing edge 557 is positioned proximate to the second surface 534 of the pre-formed laminate material 530. The dynamic delivery stage 550 is actuated along the actuation path 700 and continues in general direction 558 until the entire flexible glass 540 is laminated to the pre-formed laminate material 530 and the dynamic delivery stage 550 reaches a final position 553. The actuation path 700 may include more than one curve, arch, bend, or other undulation, for example, depending on the shape or contour of the forming surface 516. After the lamination is complete, as shown in FIG. 14, the dynamic delivery stage 550 may be reloaded with another sheet of flexible glass 540 and reset to the initial position 551 of the dynamic delivery stage 550. The velocity, direction, and angle with respect to the vacuum mold 510 of the dynamic delivery stage 550 may be continuously adjustable by the actuation mechanism 559. The dynamic motion of the dynamic delivery stage 550 may control the motion of the flexible glass 540 as it is delivered to the vacuum mold 510. For example, the dynamic delivery stage 550 may be positioned at a 30 degree angle with respect to the vacuum mold 510, thereby delivering the flexible glass 540 to the vacuum mold 510 at a 30 degree angle. In another example, the dynamic delivery stage 550 may be positioned at a 20 degree angle with respect to the vacuum mold 510, thereby delivering the flexible glass 540 to the vacuum mold 510 at a 20 degree angle. In another example, the dynamic delivery stage 550 may be positioned at a 10 degree angle with respect to the vacuum mold 510, thereby delivering the flexible glass 540 to the vacuum mold 510 at a 10 degree angle.

Referring still to FIGS. 13 and 14, when the dynamic delivery stage 550 is in the initial position 551, the programmable roller assembly 560 is in an initial position 561 proximate to the dynamic delivery stage 550. The programmable roller assembly 560 includes a roller head 562, a roller mount 564, and an actuation assembly 566. As the programmable roller assembly 560 is positioned proximate to the dynamic delivery stage 550 at the initial position 561, the roller head 562 of the programmable roller assembly 560 is near the trailing edge 557 of the dynamic delivery stage 550 and the flexible glass 540. As the dynamic delivery stage 550 is actuated along the actuation path 700, the programmable roller assembly 560 follows the dynamic delivery stage 550 along the actuation path 700, proximate to the trailing edge 557, until reaching final position 569 in FIG. 14. The roller head 562 may contact the flexible glass 540 and apply pressure, such that the flexible glass 540 is laminated to the pre-formed laminate material 530, or such that an adhesive bond is formed between the pre-formed laminate material 130 and the flexible glass 540. The actuation assembly 566 of the programmable roller assembly 560 may control the pressure, angle with respect to the vacuum mold 510, and velocity of the roller mount 564, which may determine the pressure and angle at which the roller head 562 applies pressure to the flexible glass 540. For asymmetric laminated glass structures 502, 504, a pressure profile may reduce warping. The lamination occurs at an elevated lamination temperature, which may be higher than the room temperature. The lamination temperature may be affected by the roller head 562 and may affect the material properties of the laminated glass structure 600, as discussed above.

The actuation assembly 566 may be a piston and cylinder assembly, a pneumatic assembly, a hydraulic assembly, or any other motion control assembly. The roller mount 564 of the programmable roller assembly 560 may be actuated or extended or retracted along direction 567, or at an angle with respect thereto, and follow the actuation path 700 along general direction 568, such that the flexible glass 540 is laminated to the pre-formed laminate material 530. A controller 580 may be used to control and coordinate motion of the programmable roller assembly 560 and the dynamic delivery stage 550, as shown in FIGS. 13 and 14. The pressure, angle, velocity, and other movement of the programmable roller assembly 560 may be continuously adjusted by the controller 580 connected to the actuation assembly 566.

Figure 15:
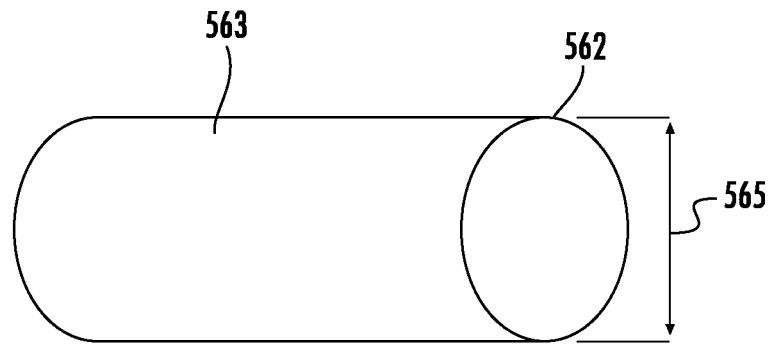
FIG. 15 illustrates an embodiment of a roller head for use in the apparatus of FIG. 13.
Figure 16:
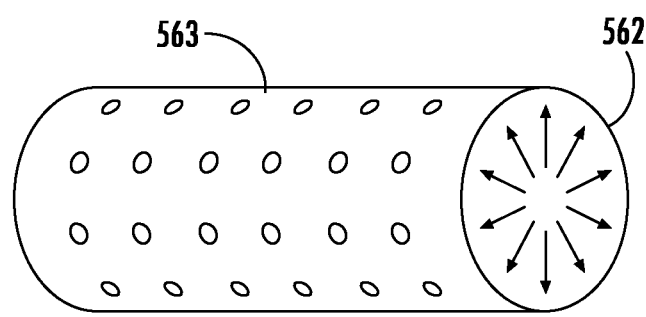
FIG. 16 illustrates another embodiment of a roller head for use in the apparatus of FIG. 13.

Surface quality of the flexible glass 540 may affect the intrinsic strength of the flexible glass 540. Scratches, fractures, or other surface damage may reduce the surface quality of the flexible glass 540 and may be caused by contaminants or particulars adhered to an outer surface 563 of the roller head 562. Two embodiments of the roller head 562 are shown in FIGS. 15 and 16. In FIG. 15, the roller head 562 is illustrated with a diameter 565 and outer surface 563. The outer surface 563 may come into contact with the flexible glass 540 during lamination. The outer surface 563 of the roller head 562 may be comprised of or otherwise be coated with a solid lubricant frictionless material or coating, such as Teflon, polyurethane, silicone, polyethylene terephthalate, or another frictionless material, thereby avoiding inflicting surface damage to the flexible glass 540. If the outer surface 563 is coated in a solid lubricant frictionless coating, the roller head 562 may operate only for a fixed number of cycles, as the coating may be stripped from the outer surface 562 of the roller head 562. The coating may then be replaced or a new roller head 562 may be used.

Another embodiment of the roller head 562 is depicted in FIG. 16, where the roller head 562 may be air-bearing, thereby avoiding direct contact with the flexible glass 540. If the roller head 562 is air-bearing, air or another gas may be injected through the outer surface 563 of the roller head 562 at a near uniform pressure as the roller head 162 follows the actuation path 300. The roller head 562 may rotate as the programmable roller assembly 560 advances along the actuation path 700, or may otherwise remain in a fixed position as the programmable roller assembly 560 advances. If the roller head 562 rotates as the programmable roller assembly 560 advances along the actuation path 700, the roller head 562 may have uniform outlets for air to be injected through the outer surface 563, such that near uniform air distribution is achieved. If the roller head 562 remains in a fixed position, only a portion of the roller head 562 that is near the flexible glass 540 may be air-bearing.

Figure 17:
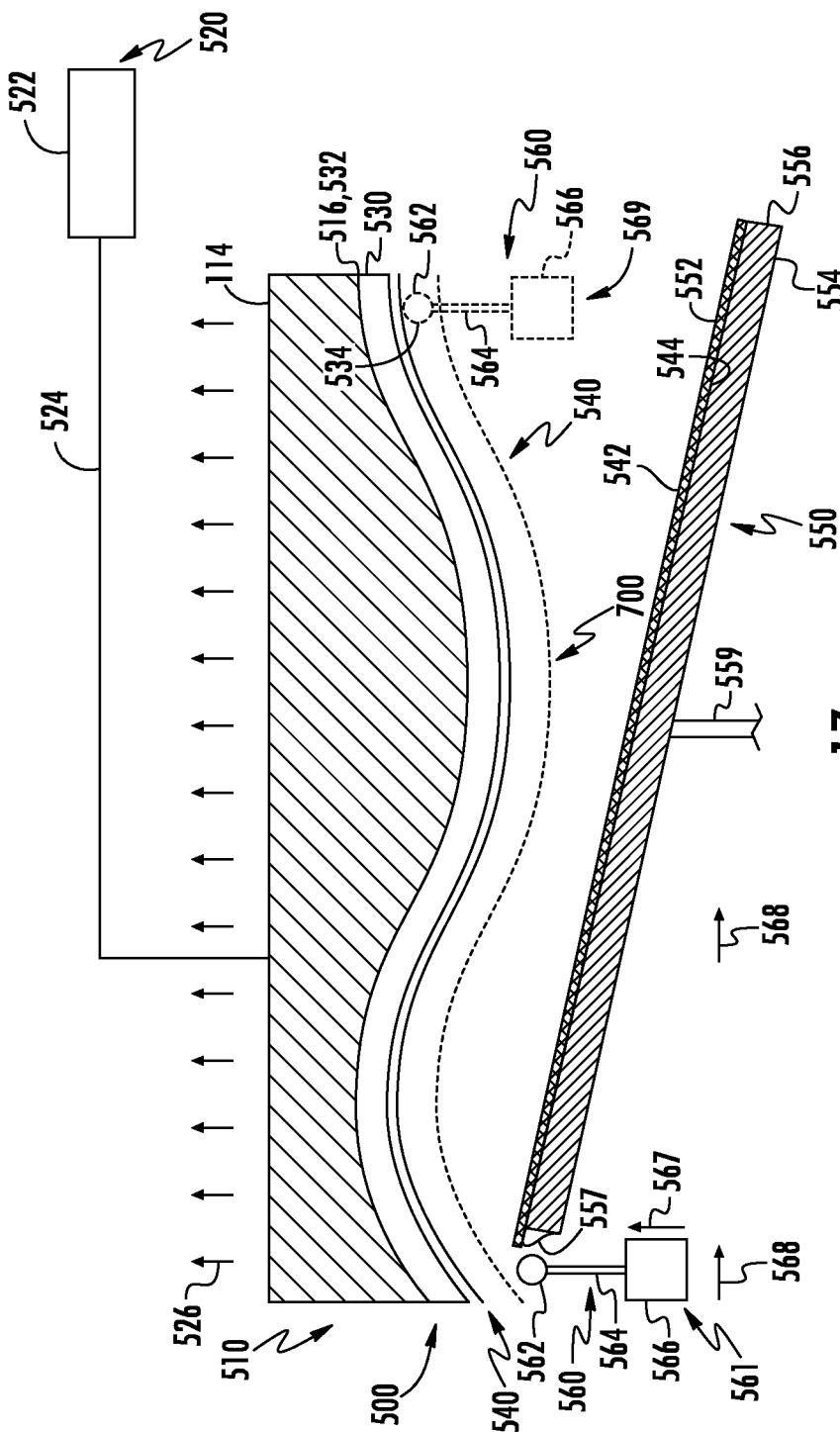
FIG. 17 illustrates another embodiment of a method and apparatus for forming a laminated glass structure.

Referring now to FIG. 17, another embodiment of the laminated glass structure forming apparatus 500 is depicted in cross-sectional view. This embodiment also includes the vacuum mold 510, the vacuum system 520, the pre-formed laminate material 530, the dynamic delivery stage 550 and the programmable roller assembly 560. However, this embodiment depicts the vacuum mold 510 wherein the forming surface 516 is of a more complex shape. The pre-formed laminate material 530 is of a likewise complex shape. In FIG. 17, the programmable roller assembly 560 is shown in the initial position 561 proximate to the trailing edge 557 of the dynamic delivery stage 550, and also at the final position 569 at an endpoint of the actuation path 700. The flexible glass 540 is shown being delivered to the pre-formed laminate material 530 as well as laminated to the pre-formed laminate material 530 and forming the laminated glass structure 600. In FIG. 17, a gap exists between the flexible glass 540 after it has been laminated, but is only for clarity. When lamination is complete, the first surface 542 of the flexible glass 540 will be coupled with the second surface 534 of the pre-formed laminate material 530 either directly or through an adhesive, for example.

Figure 18:
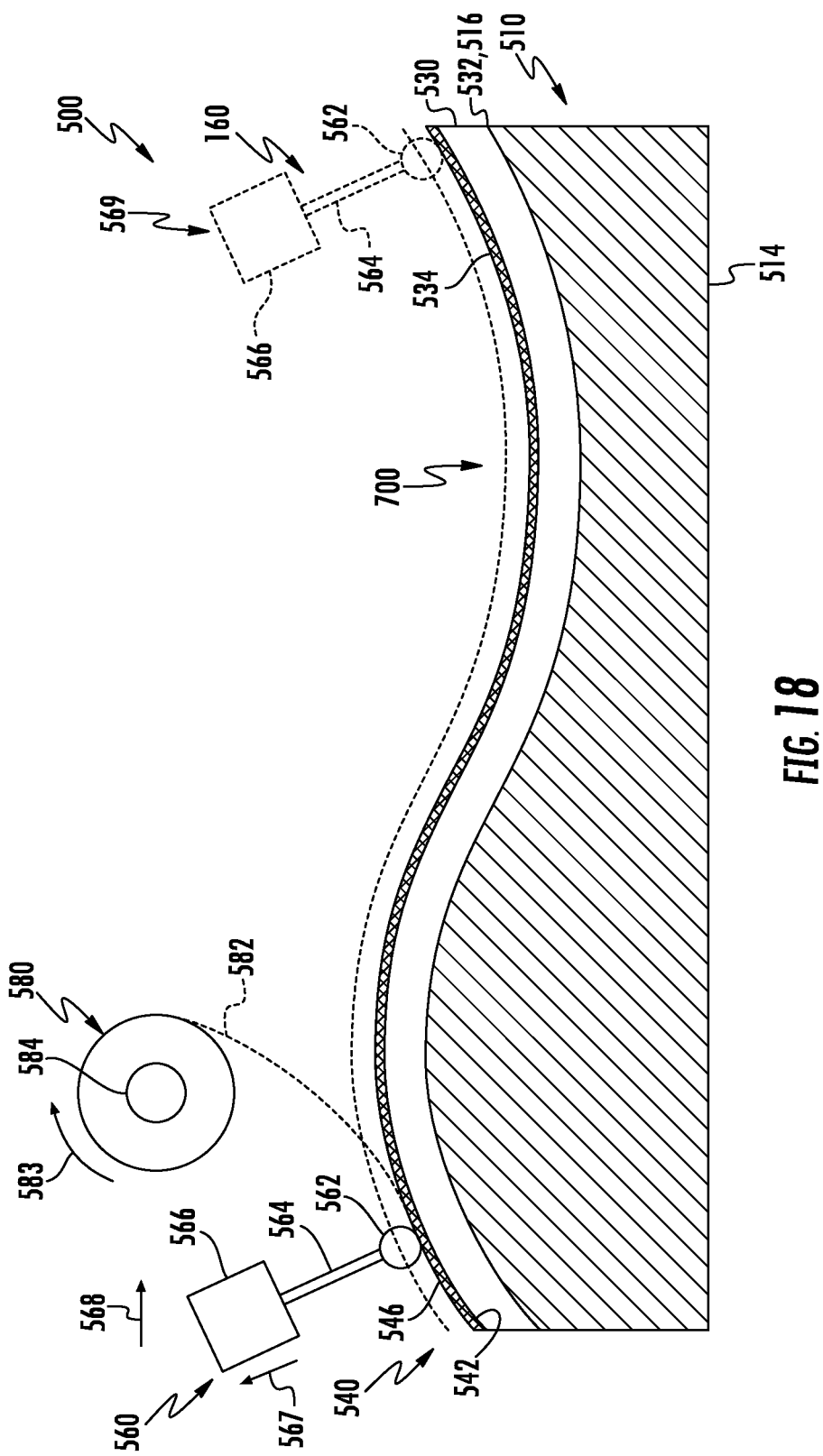
FIG. 18 illustrates another embodiment of a method and apparatus for forming a laminated glass structure.
Figure 19:
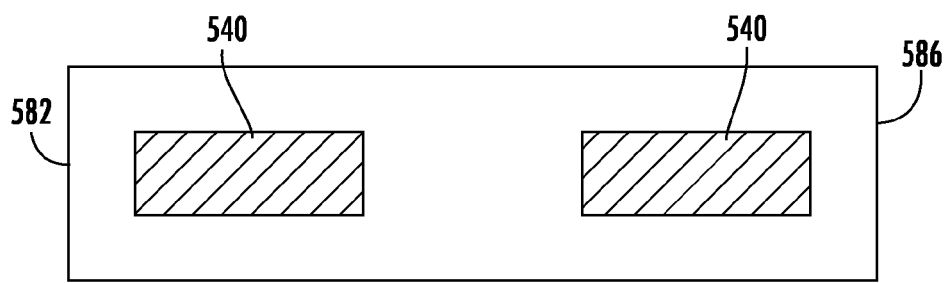
FIG. 19 illustrates discrete sheets of flexible glass carried by a flexible carrier material.

Referring now to FIG. 18, another embodiment of the laminated glass structure forming apparatus 500 is depicted in cross-sectional view. This embodiment also includes the vacuum mold 510, the vacuum system 520, the pre-formed laminate material 530 and the programmable roller assembly 560. However, in this embodiment, the flexible glass 540 is delivered to the preformed laminate material 530 from a flexible glass spool 580. The flexible glass spool 580 contains concentric layers of a flexible glass carrier 582. The flexible glass carrier 582, as shown in FIG. 19, includes discrete sheets of flexible glass 540 attached to a flexible carrier material 586. The flexible glass spool 580 may rotate in direction 583 around core 584, depending on the orientation of the laminated glass structure forming apparatus 500. As the flexible glass carrier 582 is unwound from the flexible glass spool 580, the flexible glass 540 is positioned proximate to the pre-formed laminate material 530. In one embodiment, the programmable roller assembly 560 contacts the flexible carrier material 586 with the roller head 562 and follows the actuation path 700 as in previous embodiments. When the programmable roller assembly 560 reaches the final position 569, the lamination of the flexible glass 540 to the pre-formed laminate material 530 is complete and the flexible carrier material 586 may be removed automatically or at a separate stage and apparatus. It is the relative movement of the programmable roller assembly 560 and spool 580 relative to the vacuum mold 510 that allow the application of the flexible glass to the laminate material 530. However, practically speaking, if the spool is heavy; the mold assembly may be the component to move, whereas the roller assembly may be fixed or can move in the reverse direction of the mold.

In some embodiments of the laminated glass structure forming apparatus 500 of FIG. 18, the flexible carrier material 586 may be continuously spooled as it is removed from the flexible glass 540, or the flexible carrier material 186 may be removed prior to actuation of the programmable roller assembly 560. In still another embodiment, the flexible carrier material 586 may be removed from the flexible glass 540 in a continuous fashion as the programmable roller assembly 560 advances along the actuation path 700. In some instances, the programmable roller assembly 560 may make contact with the flexible glass 540 rather than the flexible carrier material 586. In some instances the cooling of the laminate structures is done in a separate apparatus. In some other instances the laminated structures may be heated and cooled subsequently to achieve display quality optical laminates.

In addition to those provided above, further non-limiting examples of adhesive materials for laminating the non-glass substrates to the flexible glass sheets at elevated lamination temperatures include UV curable optical adhesives or optical cements such as those manufactured by Norland™ Optical Adhesives (NOA60, NOA61, NOA63, NOA65, NOA68, NOA68T, NOA71, NOA72, NOA73, NOA74, NOA75, NOA76, NOA78, NOA81, NOA84, NOA88, NOA89), Dow Corning™ (Sylgard 184 and other thermally curing silicones), Dymax™, and others. For heat-activated adhesive materials (e.g., NOA83H), adhesive materials with activation temperatures of greater than a preselected temperature (e.g., about 50° C. or more, such as about 70° C. or more, such as 80° C. or more, such as 100° C. or more) may be used to allow the substrate material an opportunity to expand relative to the flexible glass prior to its lamination thereto.

Additionally, each non-glass substrate may itself be a laminated or composite structure made of different types of metal having different Young's moduli, different Poisson's Ratios, and/or layer thicknesses. In this case, one of skill in the art would be able to homogenize the compound layer to find effective values for the overall layer, including an effective thickness, an effective Young's modulus, and an effective Poisson's Ratio that may be used as described herein to beneficially configure a glass-metal laminate. The composites, for example, may be formed of any combinations of the above materials and/or metals, such as stainless steel, nickel, copper, noble metals, metal oxides, etc.

The laminated glass structures described herein may be a optically clear formable and/or flexible structure for use as a protective element in an electronic device, wherein the laminated glass structure is a composite structure comprising a layer of flexible glass sheet 140 of a thickness from 5 to 300 microns, and a layer of non-glass substrate 130, such as metal, ranging in thickness from 0.1 mm to 5 mm. In this connection, the formability of the laminated glass structure allows it to deviate from full planarity by bending and/or twisting so it can adapt to the shape or form of some other object.

The flexible glass sheet and non-glass substrates can be provided in sheet form according to a batch process. Alternatively, the flexible glass sheet can be provided in sheet form and the non-glass substrate from a continuous roll. As a further possibility, both flexible glass sheet and non-glass substrate are from continuous rolls. Although some embodiments show that the non-glass substrate is formed and then immediately used in-line to form the laminate (see, for example, the embodiments of FIGS. 8-12, such need not be the case; instead the non-glass substrate may be formed, rolled or otherwise stored, and then at a later time used in the laminate forming process, as by unrolling for example.

For the non-glass substrate, it is possible to use polymers which can be deposited/coated as pre-polymers or pre-compounds and then converted, such as epoxy-resins, polyurethanes, phenol-formaldehyde resins, and melamine-formaldehyde resins. The lamination of the flexible glass and non-glass substrates can be with adhesive material in between the layers. In that case, adhesive material can be pre-coated onto one of the two or on both of the flexible glass sheet and non-glass substrate or otherwise supplied during the lamination process, at room or elevated lamination temperature and with or without pressure. UV-cured adhesives are also suitable. The non-glass substrate can be in the form of metal sheets which are pre-coated with a heat-seal glue. Lamination and/or deposition of the non-glass substrate onto the flexible glass sheet can be integrated in the fabrication process of the glass, i.e. flexible glass comes off the fabrication line and is then (still hot or warm or cold) coated with the metal substrate.

The above-described laminated glass structures can provide increased strength to flexible glass. Nearly constant uniform compressive stress can be provided through the glass thickness for symmetric laminate glass structures. The substrate materials can provide breakage protection and hold the flexible glass together in the event of any breakage. The laminated glass structures can provide touch and cover glass, which could be used to replace chemically strengthened glass. Curved display glass, such as that discussed above in connection with asymmetric laminated glass structure can be provided. The flexible glass can also act as a moisture barrier and block undesired UV light.

Laminated glass structures may also improve optical quality of the substrate material through the flexible glass, performance, strength, impact resistance, and mechanical durability. The substrate material may be protected from scratches, fractures, or other damage by the layer of flexible glass in the laminated glass structure. The flexible glass on an outer surface of the laminated glass structure may be easier to clean than the surface of the substrate material. For example, a refrigerator door made of a laminated glass structure with stainless steel laminated to flexible glass may be fingerprint-resistant, or a mobile electronic device battery cover made of a laminated glass structure with aluminum laminated to flexible glass may be scratch-resistant and easy to clean.

Additional functionality can be incorporated into non-glass substrates. For example, the substrate material can comprise a metal polarizer sheet, a contrast-enhancing filter-laminate, have anti-reflective properties, color filter properties or color conversion properties. Alternatively or additionally, the non-glass substrate can be designed to block undesired ambient light and/or have scattering particles so that wave guiding is reduced and the brightness of the device is increased. Still further, alternatively or additionally, the glass can have anti-microbial functionality. Such additional functionalities could be incorporated in the flexible glass.

Polymer materials are easily scratched, degrade from environmental elements including sunlight exposure and provide poor moisture/oxygen barrier properties. Glass, on the other hand, is scratch resistant, durable and is known for excellent moisture/oxygen barrier properties. However, glass has higher density compared to, for instance, metal, and is a brittle material where strength of glass is dictated by defects and flaws. The above described laminated glass structures and methods of making them take advantage of these two classes of materials and combining into one laminated structure having improved barrier properties, lightweight and higher mechanical reliability compared to a bare flexible glass stack.

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A method of forming a laminated glass structure, the method comprising:
   from a roll of a continuous ribbon of flexible glass substrate, introducing the continuous ribbon of flexible glass substrate having a thickness of no greater than 0.3 mm to a continuous ribbon of non-glass substrate material, the non-glass substrate material having a coefficient of thermal expansion (CTE) that is greater than that of the flexible glass substrate;
   continuously laminating the flexible glass substrate to the non-glass substrate material at an elevated temperature of at least about 100 degrees C.; and
   cooling the laminated glass structure to introduce a compressive stress across a thickness of the flexible glass substrate as the laminated glass structure passes continuously through a cooling station where the laminated glass structure is cooled.

2. The method of claim 1, wherein the flexible glass substrate has a compressive strength of at least 40 MPa across the thickness of the flexible glass substrate.

3. The method of claim 1, wherein the non-glass substrate material has a CTE that is at least 10 times the CTE of the flexible glass substrate.

4. The method of claim 1 further comprising providing an adhesive layer between the flexible glass substrate and the non-glass substrate material that couples the non-glass substrate material to the flexible glass substrate.

5. A method of forming a laminated glass structure, the method comprising:
- shaping a substrate into a non-planar shape, the substrate comprising a non-glass material; and
- laminating a flexible glass substrate to the substrate while the flexible glass substrate conforms to the non-planar shape of the substrate, wherein a rolling pressure is applied to the flexible glass substrate by a programmable roller assembly that moves along an actuation path during the step of laminating.

6. The method of claim 5 further comprising providing an adhesive layer between the flexible glass substrate and the substrate.

7. The method of claim 5, wherein the step of laminating the flexible glass substrate to the substrate comprises heating an adhesive layer located between the flexible glass substrate and the substrate.

8. The method of claim 5, wherein the adhesive layer is both heated and then cooled while the external pressure is applied to the one or both of the flexible glass substrate and the substrate.

9. The method of claim 5, wherein the non-glass material comprises a metal, metal alloy or polymer.

10. The method of claim 5 further comprising shaping the substrate comprises introducing the substrate to a forming surface having a non-planar contour.

11. A method of forming a laminated glass structure, the method comprising:
- introducing a flexible glass substrate as a continuous ribbon to a substrate comprising a non-glass material where the substrate of non-glass material is introduced to the flexible glass substrate as a continuous ribbon;
- forming a substrate stack including a layer of the flexible glass substrate, a layer of the substrate comprising the non-glass material and a layer of an adhesive material located between the flexible glass substrate and the substrate;
- introducing the substrate stack to a pressure zone;
- applying pressure to the substrate stack within the pressurized zone while the substrate stack is both heated and then cooled; and
- cutting the laminated glass structure into multiple, individual laminated glass structures.

12. The method of claim 11 further comprising introducing the substrate stack to the pressure zone as a continuous ribbon of the substrate stack.

13. The method of claim 11 further comprising shaping the substrate into a non-planar shape, and further wherein the step of forming the substrate stack comprises laminating the flexible glass substrate to the substrate while conforming the flexible glass to the non-planar shape of the substrate.

* * * * *